US011263566B2

(12) United States Patent
Maheshwari et al.

(10) Patent No.: US 11,263,566 B2
(45) Date of Patent: Mar. 1, 2022

(54) SEASONALITY VALIDATION AND DETERMINATION OF PATTERNS

(71) Applicant: Oracle International Corporation, Redwood Shores, CA (US)

(72) Inventors: Arvind Kumar Maheshwari, Pleasanton, CA (US); Raghav Ravichandran, Belmont, CA (US); Vladimir Volchegursky, Redwood City, CA (US); Tse-Han Huang, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 850 days.

(21) Appl. No.: 15/186,938

(22) Filed: Jun. 20, 2016

(65) Prior Publication Data

US 2017/0364851 A1 Dec. 21, 2017

(51) Int. Cl.
*G06Q 10/06* (2012.01)
*G06F 8/65* (2018.01)
*G06F 9/50* (2006.01)

(52) U.S. Cl.
CPC . *G06Q 10/06315* (2013.01); *G06Q 10/06314* (2013.01); *G06F 8/65* (2013.01); *G06F 9/50* (2013.01)

(58) Field of Classification Search
CPC ................................................ G06Q 10/06315
See application file for complete search history.

(56) References Cited

U.S. PATENT DOCUMENTS 7,987,106 B1 * 7/2011 Aykin .................. G06Q 10/063 705/7.11
2005/0108573 A1 * 5/2005 Bennett ............... G06F 11/3048 726/4

(Continued)

FOREIGN PATENT DOCUMENTS

CN 106663224 B * 2/2021 ............. G06N 20/00

OTHER PUBLICATIONS

Zhu, Qian, Jiedan Zhu, and Gagan Agrawal. "Power-aware consolidation of scientific workflows in virtualized environments." 2010. SC'10: Proceedings of the 2010 ACM/IEEE International Conference for High Performance Computing, Networking, Storage and Analysis. IEEE. (Year: 2010).*

(Continued)

*Primary Examiner* — Brian M Epstein
*Assistant Examiner* — Sara Grace Brown
(74) *Attorney, Agent, or Firm* — Invoke

(57) ABSTRACT

Techniques are described herein for seasonal pattern determination and validation. In one or more embodiments, a set of time-series data is received to analyze for seasonal behavior. In response a plurality of patterns may be generated, including a first pattern and a second pattern, such that each of the first pattern and the second pattern approximate data points that represent a same sub-period of multiple instances of a season within the set of time-series data. One or more other instances of the season may then be analyzed to determine whether at least part of the first pattern or the second pattern is detected. Based at least in part on determining that the at least part of the first pattern is detected in the at least part of the same sub-period, a responsive action that is associated with the first pattern may be performed.

28 Claims, 12 Drawing Sheets

(56) References Cited

U.S. PATENT DOCUMENTS

| | | | | |
|---|---|---|---|---|
| 2007/0168494 | A1* | 7/2007 | Liu | G06Q 10/06 709/224 |
| 2009/0018798 | A1* | 1/2009 | Dorneich | G06F 17/18 702/179 |
| 2009/0198648 | A1* | 8/2009 | Middleton | G06F 16/2428 |
| 2010/0153157 | A1* | 6/2010 | Wade | G06Q 10/0631 705/7.12 |
| 2013/0006636 | A1* | 1/2013 | Mizuguchi | G06F 16/313 704/245 |
| 2013/0185729 | A1* | 7/2013 | Vasic | G06F 9/5072 718/104 |
| 2014/0279779 | A1* | 9/2014 | Zou | G06N 3/08 706/25 |
| 2015/0040052 | A1* | 2/2015 | Noel | G06F 3/04847 715/771 |
| 2016/0103887 | A1* | 4/2016 | Fletcher | H04L 41/22 707/722 |
| 2016/0105327 | A9* | 4/2016 | Cremonesi | H04L 41/142 706/21 |
| 2016/0110812 | A1* | 4/2016 | Mun | G06Q 40/06 705/36 R |
| 2016/0210556 | A1* | 7/2016 | Ben Simhon | G06F 11/07 |
| 2016/0269431 | A1* | 9/2016 | Singla | H04L 63/1425 |
| 2016/0342909 | A1* | 11/2016 | Chu | G06Q 10/063 |
| 2017/0132089 | A1* | 5/2017 | Roehrsheim | G06F 11/3006 |
| 2017/0220407 | A1* | 8/2017 | Estrada | G06F 11/3495 |
| 2017/0228661 | A1* | 8/2017 | Chien | G06Q 10/063 |
| 2017/0249376 | A1 | 8/2017 | Garvey et al. | |
| 2017/0249562 | A1 | 8/2017 | Garvey et al. | |
| 2017/0249648 | A1 | 8/2017 | Garvey et al. | |
| 2017/0249649 | A1 | 8/2017 | Garvey et al. | |
| 2017/0249763 | A1 | 8/2017 | Garvey et al. | |
| 2017/0279698 | A1* | 9/2017 | Sartran | H04L 41/142 |
| 2019/0026351 | A1* | 1/2019 | Maor | G06F 16/24578 |
| 2019/0220298 | A1* | 7/2019 | Jiao | G06F 9/45558 |

OTHER PUBLICATIONS

Liao, T. Warren. "Clustering of time series data—a survey." 2005. Pattern recognition 38.11: 1857-1874. (Year: 2005).*

Kumar, Mahesh, Nitin R. Patel, and Jonathan Woo. "Clustering seasonality patterns in the presence of errors." Proceedings of the eighth ACM SIGKDD international conference on Knowledge discovery and data mining. 2002. (Year: 2002).*

Afify, Yasmine M., et al. "A semantic-based software-as-a-service (saas) discovery and selection system." 2013 8th International Conference on Computer Engineering & Systems (ICCES). IEEE, 2013. (Year: 2013).*

Cohen, Ira, et al. "Capturing, indexing, clustering, and retrieving system history." 2005. ACM SIGOPS Operating Systems Review 39.5: 105-118. (Year: 2005).*

* cited by examiner

SEASONALITY VALIDATION AND DETERMINATION OF PATTERNS

TECHNICAL FIELD

The present disclosure relates to analyzing seasonality characteristics of a set of time-series data. In particular, the present disclosure relates to generating and validating seasonal patterns based on detected behavior within the set of time-series data.

BACKGROUND

Organizations, data analysts, and other entities are often interested in the seasonal aspects within a time-series. For example, an organization may break up their time series datasets into weekly chunks and analyze average resource usage at different times of the week. By analyzing seasonal behavior, it is possible to gain better insights into how a season influences the dataset and how to better plan for the future. As an example, organizations sometimes rely on system administrators or other personnel to ensure that resources deployed by the organization are sufficient to meet demand. A failure to account for seasonal factors may lead to poor capacity planning and negatively impact the organization's operations. Insufficient hardware and software capacity, inventory, or personnel may result in consumer requests going unfulfilled. On the other hand, excess capacity results in under-utilized resources, which may be energy inefficient and result in unnecessary costs to the organization.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
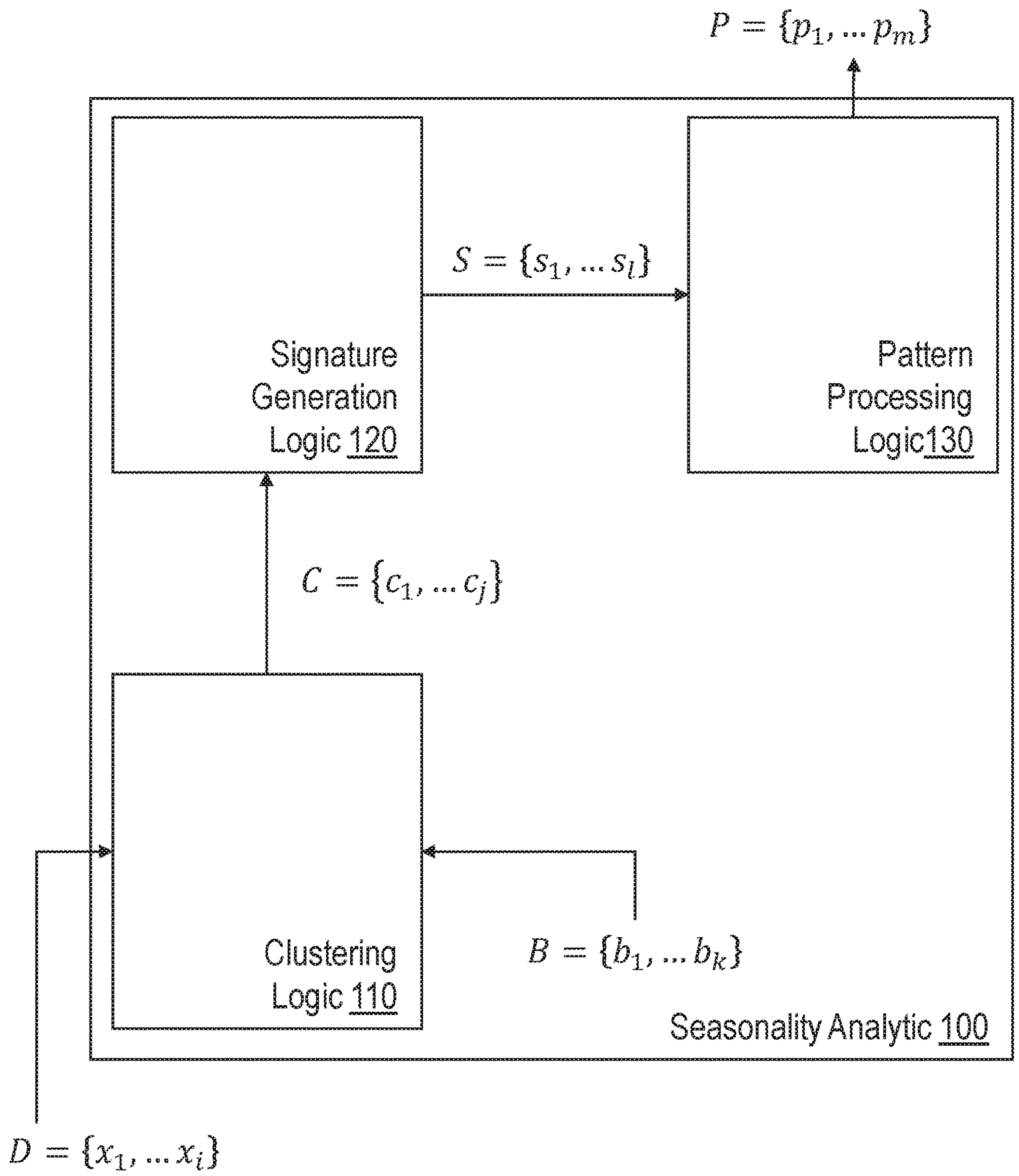
FIG. 1 illustrates a system for performing seasonality validation and pattern generation in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SEASONALITY VALIDATION AND PATTERN GENERATION ANALYTIC
3. SIMILARITY BASED GROUPING OF SEASONAL INSTANCES
4. PATTERN SIGNATURES AND STRENGTHS
5. NON-CONFORMANCE ANALYSIS
6. MULTI-PATTERN ANALYTICS
7. PATTERNLESS DATASETS
8. PATTERN SELECTION AND RECOMMENDATIONS
9. HARDWARE OVERVIEW
10. MISCELLANEOUS; EXTENSIONS

1. General Overview

Time-series data often exhibit seasonal variations in peaks and lows. As previously noted, failure to account for such seasonal variations may result in poor planning decisions and inefficient resource utilization. For instance, a middleware administrator at an Internet-based retailer may be responsible for ensuring that there are enough hardware resources during peak times to satisfy demand. The administrator may plot a trend line using a linear regression model to predict whether current hardware is sufficient for peak months. However, linear regression does not account for seasonal fluctuations in the time-series. In the event that online traffic is greatly reduced in the late evening hours, the linear regression model may underestimate future peak values or overestimate future trough values, both of which lead to a wasteful use of computational resources (including computer hardware, software, storage, and processor resources, and any services or other resources built on top of those resources). Other seasonal factors, such as increased volume around holidays or sales event, may also cause the linear regression model to generate inaccurate forecasts.

Rather than relying on linear regression, an administrator may instead use a Holt-Winters forecasting model to account for seasonality in the time-series. The Holt-Winters forecasting model relies on a triple exponential smoothing function to model levels, trends, and seasonality within the time-series. A "season" in this context refers to a period of time before an exhibited behavior begins to repeat itself. The additive seasonal model is given by the following formulas:

$$L_t=\alpha(X_t-S_{t-p})+(1-\alpha)(L_{t-1}+T_{t-1}) \quad (1)$$

$$T_t=\gamma(L_t-L_{t-1})+(1-\gamma)T_{t-1} \quad (2)$$

$$S_t=\delta(X_t-L_t)+(1-\delta)S_{t-p} \quad (3)$$

where $X_t$, $L_t$, $T_t$, and $S_t$ denote the observed level, local mean level, trend, and seasonal index at time t, respectively. Parameters α, γ, δ denote smoothing parameters for updating the mean level, trend, and seasonal index, respectively, and p denotes the duration of the seasonal pattern. The forecast is given as follows:

$$F_{t+k}=L_t+k\ T_t+S_{t+k-p} \quad (4)$$

where $F_{t+k}$ denotes the forecast at future time t+k.

The additive seasonal model is typically applied when seasonal fluctuations are independent of the overall level of the time-series data. An alternative, referred to as the multiplicative model, is often applied if the size of seasonal fluctuations vary based on the overall level of the time series data. The multiplicative model is given by the following formulas:

$$L_t=\alpha(X_t-S_{t-p})+(1-\alpha)(L_{t-1}+T_{t-1}) \quad (1)$$

$$T_t=\gamma(L_t-L_{t-1})+(1-\gamma)T_{t-1} \quad (2)$$

$$S_t=\delta(X_t-L_t)+(1-\delta)S_{t-p} \quad (3)$$

where, as before, $X_t$, $L_t$, $T_t$, and $S_t$ denote the observed level, local mean level, trend, and seasonal index at time t, respectively. The forecast is then given by the following formula:

$$F_{t+k}=(L_t+k\ T_t)S_{t+k-p} \quad (8)$$

Predictive models such as triple exponential smoothing are primarily focused on generating forecasts about future events. While the Holt-Winter additive and multiplicative models take into account seasonal indices to generate the forecast, these models provide limited information on any seasonal patterns that may exist in the time-series data. For instance, the seasonal indices represented by equations (3) and (7) operate within the bounds of the forecasting models to which they are tied. As a result, the seasonal data output by these formulas does not lend itself to meaningful interpretation in contexts outside of the specific forecasting models for which the seasonal data was generated. Further, these seasonal indices are typically implemented as internal structures that are not exposed to the end user. Therefore, the end user may have little or no underlying notion of any of the seasonal patterns that were used to generate a forecast.

Another deficiency with the Holt-Winters models is that they are designed to model time-series with a single seasonal cycle. Many time-series may be more efficiently and accurately represented as multiple seasonal patterns mixed together. For example, a weekly cycle may follow a particular pattern for each week in a month with the exception of the last week of the month, where a different pattern emerges. In such a scenario, the first three weeks of the month may lead the Holt-Winters produce inaccurate estimates for the last week of the month if seasonal index is modelling a weekly season.

Systems and methods are described through which seasonality within a time-series may be automatically detected and seasonal patterns extrapolated from the dataset. A "seasonal pattern" in this context refers to any set of data points or other data structure that approximates or otherwise represents seasonal behavior detected within a set of time-series data. A behavior may be classified as "seasonal" if it occurs at regular or semi-regular intervals, where the duration of the interval corresponds to a "season".

The approaches described herein allow for different seasonal patterns to be efficiently and automatically detected, generated, and/or rated for the same period or sub-period of a season, without relying on the visual guesswork of a human analyst. In one or more embodiments, a set of time-series data is received to analyze for seasonal behavior. In response a plurality of patterns may be generated, including a first pattern and a second pattern, such that each of the first pattern and the second pattern approximate data points that represent a same sub-period of multiple instances of a season within the set of time-series data. In other words, the first pattern and the second pattern represent different behaviors exhibited during the same period or sub-period in different instances of the season. Put yet another way, the first and second pattern may fully or partially overlap at one or more ranges of time offsets within different instances of same-length seasons. Thus, in the set of time-series data, a first set of instances of the season contain corresponding data points that align more closely to the first pattern than to other patterns in the plurality of patterns and a second set of instances of these season contain corresponding data points that align more closely to the second pattern than other patterns in the plurality of patterns.

Data points are said to "align more closely" to one pattern than another pattern if one pattern is determined to be a better approximation of the behavior exhibited by the data points than another pattern. The determination of whether data points align more closely with one pattern than another pattern may be determined based, at least in part, on a similarity function. Example similarity functions are described in further detail below.

The seasonal pattern(s) that are generated may be used to perform one or more analytical operations, which may include, without limitation, capacity planning operations, anomaly detection, and other seasonality-aware operations. For example, if two or more seasonal patterns are generated for the same sub-period of a season, then one or more other instances of the season may be analyzed to determine whether at least part of a pattern from the two or more seasonal patterns is detected in one or more future instances of the season. Depending on which pattern is detected, an associated responsive action may be performed The approaches described herein may further allow for the automatic selection of a seasonal timeframe for which to analyze a time-series. As part of the selection process, a plurality of patterns, including a first pattern and a second pattern, may be generated for an input set of time-series data such that the first pattern and the second pattern correspond to different sub-periods of a season or different seasonal periods. A strength of seasonality may then be computed for the first pattern and the second pattern and compared to determine which pattern exhibits stronger seasonal behavior. In response to identifying that the first pattern has a stronger seasonality than the other patterns, then the first pattern may be recommended to a user or automatically selected for use in further analytic operations.

2. Seasonality Validation and Pattern Generation Analytic

With reference to FIG. 1, seasonality analytic 100 includes logic for validating whether seasonal behavior is present in a time-series and generating patterns for validated seasonal behavior. Seasonality analytic 100 receives, as input, a set D of time-series data comprising data points $\{x_1, \ldots, x_i\}$. In response, seasonality analytic 100 outputs a set P of patterns $\{p_1, \ldots, p_m\}$ if any seasonal behaviors are detected within the set D of time-series data.

In order to validate seasonal behavior and generate corresponding patterns, seasonality analytic 100 includes various logic units such as clustering logic 110, signature generation logic 120, and pattern processing logic 130. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

In one or more embodiments, the set D of time-series data corresponds to one or more metrics that measure a series of values over time. As an example, a sample data point within the time-series may capture a performance attribute of a hardware or software resource at a particular time. As another example, a sample data point within the time-series may correspond to a measure of a physical property, such as temperature, pressure, motion, traffic flow, or other attributes of an object or environment that is captured using one or more sensors. The set D of time-series data may be input into seasonality analytic 100 directly by a user, such as a system administrator or separate application, or may be automatically collected by seasonality analytic 100 from one or more sources.

Clustering logic 110 receives, as input, the set D of time-series data and a set B of one or more seasonality buckets $\{b_1, \ldots, b_k\}$. A "seasonality bucket" in this context refers to data that indicates a season for which seasonal behavior is analyzed and patterns are generated. For instance, the set B of seasonality buckets indicate that the set D of time-series data should be analyzed for hourly patterns, daily patterns, weekly patterns, monthly patterns, etc.

A seasonality bucket may correspond to a whole period of a season or any sub-period thereof. For example, a seasonality bucket may correspond to Monday through Friday or some other subset of days for a season having a duration of a week or may correspond to the entire week. "Target sub-period(s)" or "sub-period(s) of interest, as used herein, refers to one or more sub-periods or the whole period of a season that is represented by a selected seasonality bucket. Example seasonality buckets and their corresponding target sub-periods may include, without limitation:

| | | |
|---|---|---|
| Daily | 8 Hour Buckets from 12 AM-8 AM<br>8 Hour Buckets from 9 AM-5 PM | |
| Weekly | Weekday (Monday~Friday) | of each week |
| | Weekend (Sat~Sun) | of each week |
| | Weekend + Friday (Fri~Sun) | of each week |
| | Monday | of each week |
| | Friday | of each week |
| | Saturday | of each week |
| | Sunday | of each week |
| Monthly | First week | of each month |
| | Last week | of each month |
| | First day | of each month |
| | Last day | of each month |
| | First Monday | of each month |
| | Last Friday | of each month |
| Quarterly | First month | of each quarter |
| | Third month | of each quarter |
| | 1st week | of each quarter |
| | last week | of each quarter |
| | 1st day | of each quarter |
| | last day | of each quarter |
| | 1st Monday | of each quarter |
| | last Friday | of each quarter |
| Annually | 1st Quarter | of each year |
| | last Quarter | of each year |
| | January | of each year |
| | November | of each year |
| | December | of each year |
| | 1st week | of each year |
| | last week | of each year |
| | 1st day | of each year |
| | last day | of each year |
| Holiday | Independence Day | of each year |
| | Thanksgiving | of each year |
| | Black Friday | of each year |
| | Cyber Monday | of each year |
| | Christmas-New Year | of each year |
| | Other Holidays, Special Days, and/or Holiday weekends | of each year, quarter, month, and/or week |

In one or more embodiments, a user may select one or more seasonality buckets to analyze. In order to select a seasonality bucket, the user may provide any indication of a timeframe to search for seasonal behavior. For instance, the user may indicate a particular season (e.g., day, week, month, etc.) or one or more sub-periods of a season (e.g., weekends, peak hours 10 AM-5 PM, etc.) that they would like to analyze. This allows the user to specify the data points from the set of time-series data where seasonal behavior is suspected. In cases where the user is familiar with the typical behavior of a system, the user input may be leveraged to reduce the amount of computational overhead incurred by seasonality analytic 100 in order to generate set P of patterns. As an example, if the user thinks there may be a pattern in set D every day from 9 AM to 6 PM or over some other period of time, then the user may provide this information to seasonality analytic 100. In response, seasonality analytic 100 may focus pattern generation on the timeframe specified by the user. Seasonality analytic 100 may generate a pattern for the specified timeframe and/or recommend alternative timeframes that have a stronger seasonality.

In one or more embodiments, seasonality analytic 100 may analyze seasonality buckets that are within a threshold range of a timeframe input by a user. For instance, if a user suspects that a seasonal pattern may be present in the set D of time-series data between 9 AM to 5 PM, Monday through Friday, and specifies this seasonality bucket as input, then seasonality analytic 100 may add one or more other seasonality buckets and/or otherwise adjust the specified timeframe to expand the scope of time that is analyzed for seasonal patterns. In the present example, a seasonality bucket may be added to analyze additional hours of the day (e.g., 8 AM to 6 PM), additional days of the week (e.g., Monday through Saturday), and/or other timeframes that surround, are adjacent to, or are otherwise within a threshold range from the provided timeframe. When expanding the scope of time that is analyzed, the search may be restricted to seasonal buckets that have the same seasonal intervals or may be expanded to include seasonal buckets having different intervals, depending on the particular implementation. Thus, if the user is interested in generating weekly patterns, the scope may be expanded to approximate daily, bi-weekly or monthly patterns.

If a timeframe is not explicitly provided, then seasonality analytic 100 may use a set of pre-defined seasonality buckets to analyze seasonal behavior. Seasonality analytic 100 may select one or more of the seasonality buckets previously specified and/or any other pre-defined timeframe to analyze.

In one embodiment, the seasonality analytic 100 may use a seasonality bucket as determined automatically by a seasonal approximation engine, such as an engine implementing the techniques described in any of U.S. Pat. Appln. No. 62/301,585, entitled "METHOD FOR CREATING PERIOD PROFILE FOR TIME-SERIES DATA WITH RECURRENT PATTERNS"U.S. Pat. Appln. No. 62/301,590, entitled "SEASONAL AWARE METHOD FOR FORECASTING AND CAPACITY PLANNING"; U.S. patent application Ser. No. 15/057,065, entitled "SYSTEM FOR DETECTING AND CHARACTERIZING SEASONS"; U.S. patent application Ser. No. 15/057,062, entitled "UNSUPERVISED METHOD FOR CLASSIFYING SEASONAL PATTERNS"; U.S. patent application Ser. No. 15/057,060, entitled "SUPERVISED METHOD FOR CLASSIFYING SEASONAL PATTERNS"; U.S. patent application Ser. No. 15/140,358, entitled "SCALABLE TRIPOINT ARBITRATION AND CLUSTERING"; and U.S. patent application Ser. No. 15/155,486, entitled "CORRELATION-BASED ANALYTIC FOR TIME-SERIES DATA", the entire contents for each of which are incorporated by reference herein in its entirety as if fully set forth herein. These prior techniques for approximating seasons by the seasonal approximation engine include supervised or unsupervised techniques that may determine, as an output, an approximated seasonal period. That approximated seasonal period, alternatively from or in addition to the user input, may be an input to the seasonality analytic 100 of the present disclosure, serving as the season to analyze.

Clustering logic 110 generates a set C of one or more clusters $\{c_1, \ldots c_j\}$ based on the input set D of time-series data and the set B of seasonality buckets. For each seasonality bucket in the set B, clustering logic 110 extracts a set of instances of the season, where each instance comprises data points from period or sub-period of the season corresponding to the seasonality bucket. As an example, for a seasonality bucket representing Mondays in a weekly season, each instance may comprise data points from different respective Mondays within the input set D of time-series data. For each seasonality bucket that is analyzed, clustering logic 110 outputs a set of one or more clusters that groups instances of the target sub-period of the season.

Signature generation logic 120 receives set C of clusters as input and generates a set S of one or more signatures. A "signature" in this context comprises a vector of data points that approximate or otherwise represent a distribution of data points within a cluster. For a given cluster that groups different instances of a Monday, for instance, signature generation logic 120 may generate a vector that approximates what the data points of a prototypical Monday that aligns with the respective pattern would look like.

Pattern processing logic 130 receives set S of signatures and generates a set P of patterns. A pattern in this context may comprise any data that approximates data points from one or more sub-periods of a season or the entire period of a season. For instance, a pattern may comprise a signature that is computed based on the data distribution amongst one or more sub-periods from different instances of a season. As another example, a pattern may comprise a signature that is computed based on the data of an entire seasonal period.

In addition or alternatively, pattern processing logic 130 may output one or more other parameters that characterize the seasonality of time-series data D. Example parameters may include, without limitation:

- Number of Seasonal Patterns: This parameter is a value that indicates the number of seasonal patterns that have been validated and generated for the input set D of time-series data.
- Strength of Each Seasonal Pattern: For each seasonal pattern that is output, a strength of seasonality value may be computed that indicates how strong the seasonality is for the respective seasonal pattern. The greater the deviation between different instances of a season for the sub-periods corresponding to a seasonality bucket, the weaker the strength of seasonality. Conversely, when there is little deviation between different instances for the target sub-periods, the greater the strength of seasonality.
- Signature of the Seasonal Pattern: A signature approximates the data distribution for one or more sub-periods or the entire period of a season. The signature may be computed based, at least in part, on the centroid of a cluster as described in further detail below.
- Point Causing Non-Conformance: This parameter identifies data points and/or windows of time that reduce the strength of seasonality for a given seasonal pattern. For instance, if the user has asked to validate the seasonality between Monday to Friday, pattern processing logic 130 may detect that there is a stronger strength between Monday to Thursday and that Friday is reducing the strength of the seasonality. This information may be provided to the user so that they may perform analytic operations using a stronger seasonal pattern.

Figure 2:
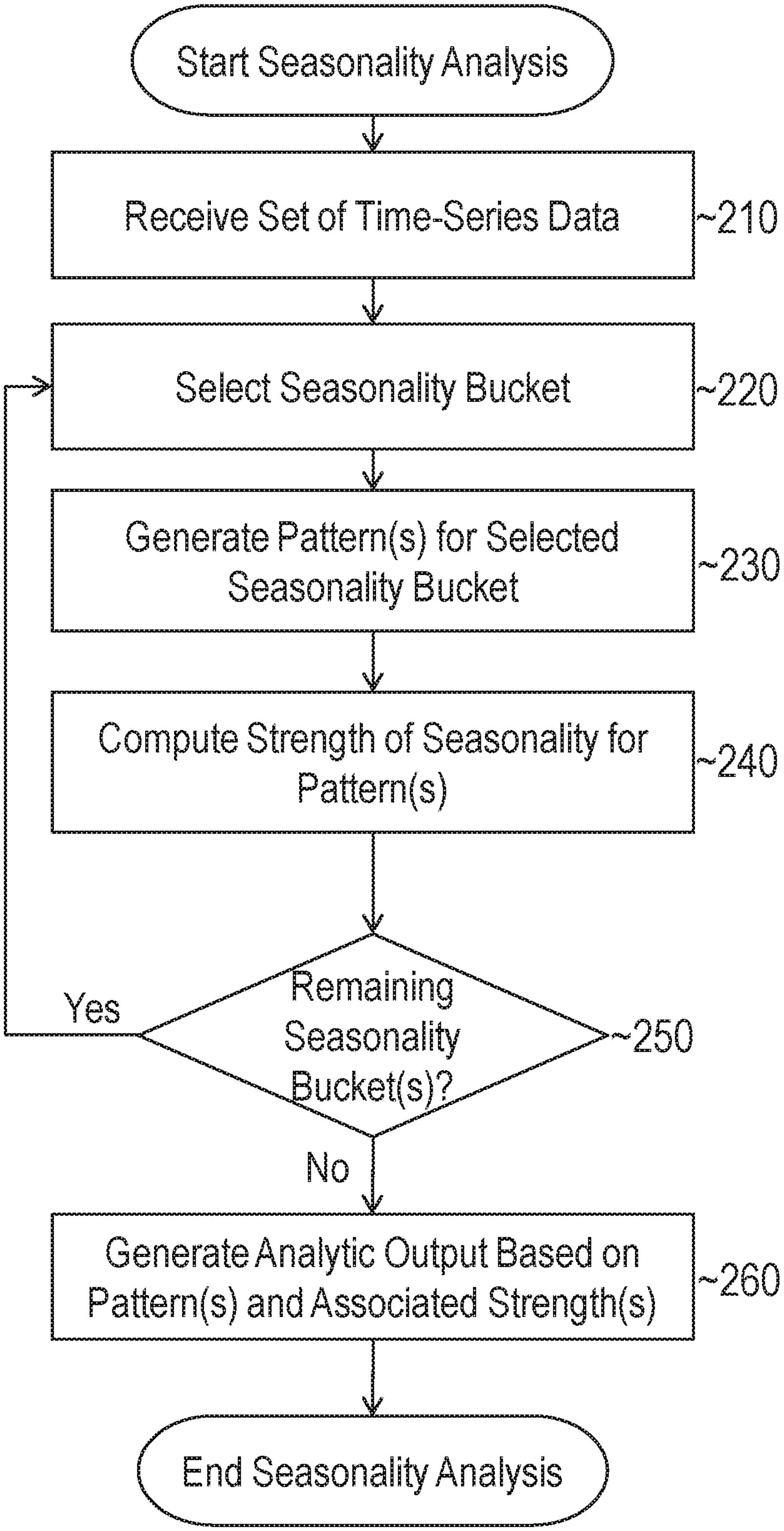
FIG. 2 illustrates an example set of operations for analyzing seasonal behavior within a set of time-series data and generating seasonal patterns in accordance with one or more embodiments.

With reference to FIG. 2, an example set of operations for analyzing seasonal behavior within a set of time-series data and generating seasonal patterns is illustrated. At 210, seasonality analytic 100 receives set D of time-series data. At 220, seasonality analytic 100 selects a seasonality bucket from the set B of seasonality buckets. At 230, seasonality analytic 100 generates one or more patterns for the selected seasonality bucket. At 240, seasonality analytic 100 computes a strength of seasonality for the one or more patterns that are generated for the selected seasonality bucket. At 250, seasonality analytic 100 determines whether there are any remaining seasonality buckets in the set B. If so, then seasonality analytic 100 selects the next bucket in the set and returns to 220, where the process is repeated for the next seasonality bucket. If there are no remaining seasonality buckets to analyze, then seasonality analytic 100 proceeds to 260 and generates an analytic output based on the patterns and associated strength values.

3. Similarity Based Grouping of Seasonal Instances

For a given seasonality bucket, clustering logic 100 may group instances into one or more clusters based, at least in part, on a similarity analysis. Instances that are determined to have similar distributions for the target sub-period(s) of interest may be grouped together, while instances that have dissimilar distributions of data may be grouped separately.

Clusters may then be independently analyzed to determine whether the instances that are grouped exhibit seasonal behavior.

Figure 3:
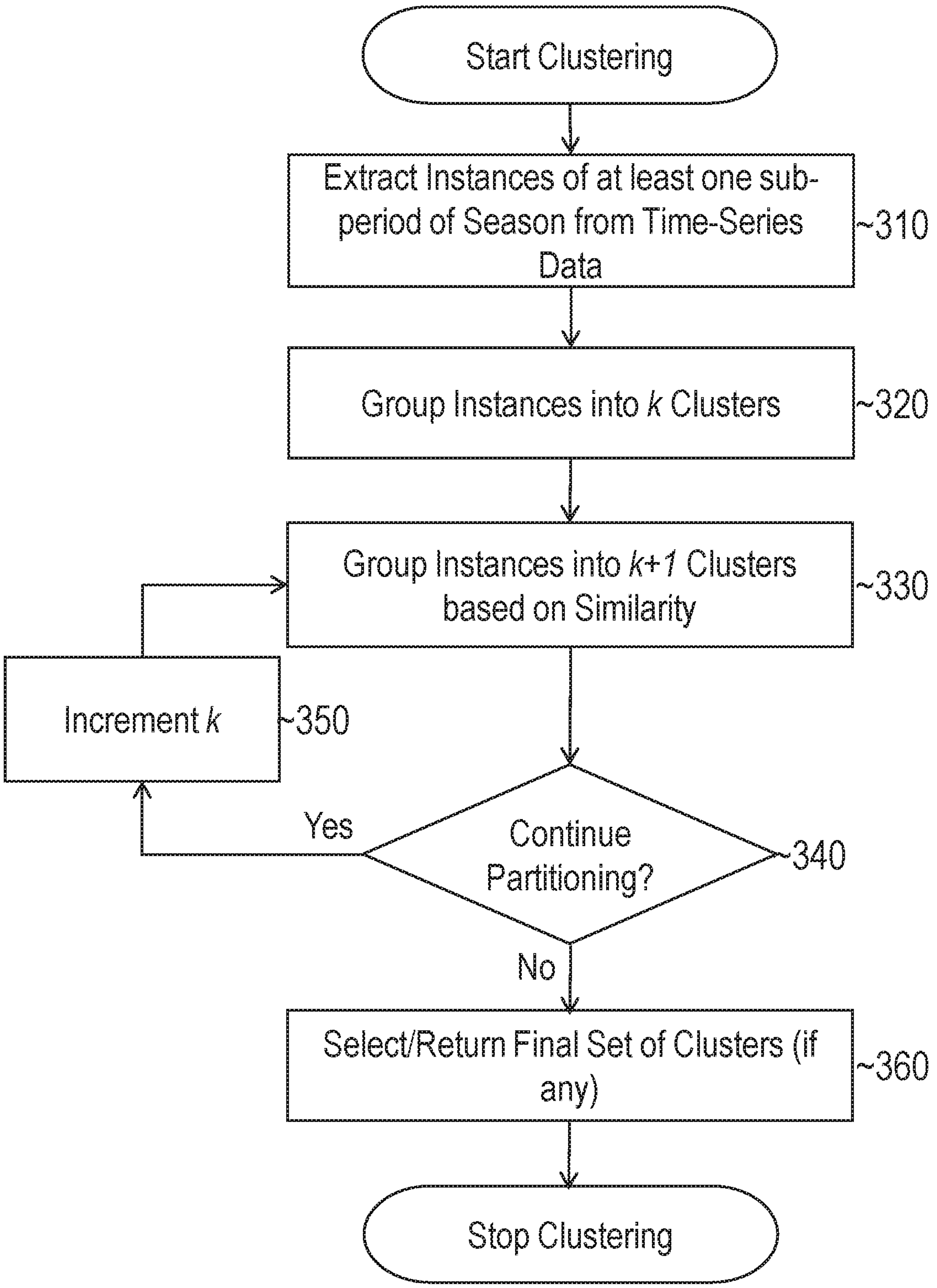
FIG. 3 illustrates an example set of operations for clustering instances of a season based on similarity in accordance with one or more embodiments.

With reference to FIG. 3, an example set of operations for clustering instances of a season based on similarity is illustrated. At 310, clustering logic 110 extracts instances of a target sub-period(s) (or period) of a season from the set D of time-series data. The instances that are extracted by clustering logic 110 may comprise data points from the target sub-period of the selected seasonality bucket. For instance, if analyzing Mondays for a weekly season, then a first instance may comprise a first set of data points collected from a first Monday in the time-series, a second instance may comprise a second set of data points collected from a second Monday in the time-series, etc. Thus, each instance may be thought of as its own time-series or vector that contains sample values from different respective Mondays of the input set of time-series data.

At 320, clustering logic 110 groups instances of the season into k clusters, where k represents a positive integer. In one or more embodiments, clustering logic 110 begins with one cluster that groups each of the extracted instances. A single cluster may be generated without performing a similarity analysis. If more than one cluster is generated at this step, then clustering logic 110 may perform k-means clustering or any other similarity-based clustering algorithm to group the instances of the season.

With k-means clustering, an initial partition is performed to create k clusters, where each cluster groups a different set of instances. The process computes the centroid for each cluster and then iterates through each of the instances to determine whether to assign any of the instances to a different cluster. If an instance is more similar to the centroid of a particular cluster that is different than the cluster to which the instance is currently assigned, then the process reassigns the instance to the particular cluster and recomputes the centroids of the cluster. The process then repeats the steps of reassigning instances and updates the cluster centroids until no further instances are reassigned.

In one or more embodiments, a cosine-based similarity function is used to determine whether an instance is more similar to one cluster than another cluster. As previously mentioned, an instance may be represented as a vector of data points from a time-series. The centroid of a cluster may also be represented as a vector of data points that is computed based on the distribution of data points currently assigned to the cluster. In order to measure the similarity between the instance and the centroid, a cosine squared similarity function may be computed as a function of the dot product and magnitude of the two vectors as follows:

$$S_{X,Y} = \cos^2(\theta) = \left(\frac{X * Y}{\|X\|\|Y\|}\right)^2 \tag{9}$$

where $S_{X,Y}$ is a similarity value that ranges from zero to one, X is a vector representing the instance being analyzed, and Y is a vector representing the centroid of a cluster. The process may assign an instance to the cluster where $S_{X,Y}$ is closest to one.

At 330 clustering logic 110 groups the instances into k+1 clusters based on similarity. Clustering logic 110 may perform k-means clustering such as described above or may apply any other clustering algorithm to group the instances based on similarity. After this step, clustering logic 110 has generated two separate sets of clusters—one set that has k clusters and another that has k+1 clusters.

At 340 clustering logic 110 determines whether to continue partitioning the clusters and generate additional groupings of instances. In one or more embodiments, a predefined number of partitions may be made. For instance, clustering logic 110 may limit the number of clusters to three or less or some other threshold. In addition or alternatively, some other set of partitioning criteria may be used to determine whether to continue partitioning the clusters. For instance, partitioning may continue if the deviation between instances that belong to a cluster exceeds a threshold or based on some other similarity threshold.

If clustering logic 110 determines that partitioning should continue, then the process continues to 350, and k is incremented. Clustering logic 110 then generates an additional grouping of instances that includes one additional cluster.

At 360, clustering logic 110 selects and returns a final set of clusters based on the different sets of clusters that have been generated. In one or more embodiments, clustering logic 110 computes an objective function by estimating the sum of squares error for each clustering. A change in the slope of the objective function that is greater than a threshold percent (e.g., thirty percent) may be indicative of seasonality amongst the groupings. For instance, if the slope of the objective function changes more than thirty percent with two clusters but does not change with three clusters, then clustering logic 110 may select two clusters as the optimal grouping and return the clusters as the final set of clusters. In another example, if the slope of the objective function does not change for any of the groupings, then clustering logic 110 may detect that there is no seasonality and output an indication that seasonal behavior could not be validated.

If there are multiple seasonality buckets to analyze, then the set of operations illustrated in FIG. 3 may be repeated for each seasonality bucket. In this way, instances of different sub-periods of a season may be analyzed independently. For example, clustering logic 110 may cluster instances corresponding to different Mondays for a first seasonality bucket, cluster instances corresponding to different weekends for a second seasonality bucket, etc.

In some cases, instances may include overlapping data points. This may occur when the target sub-period for one seasonality bucket includes at least a portion of the target sub-period for another seasonality bucket. For instance, clustering logic 110 may cluster instances corresponding to different Mondays for a first seasonality bucket and then cluster instances corresponding to Monday through Friday for a second seasonality bucket. In other words, for the first seasonality bucket, Mondays that are similar are be grouped together whereas for the second seasonality bucket, the similarity function accounts for the entire work week. This may result in Mondays being grouped differently than when they are grouped in isolation.

4. Pattern Signatures and Strengths

In one or more embodiments, a set of pattern signatures and strengths are generated, based at least in part, on the clusters output by clustering logic 110. A signature in this context refers to a set of data points that approximates or otherwise represents a prototypical distribution of data for a given seasonal behavior. The term "pattern" may be used synonymously with signature but may include, in addition or alternatively, other data that represents seasonal behavior such as the clusters described above, an identification of the timeframe that exhibits the seasonal behavior, and data that describes the seasonal behavior.

Figure 4:
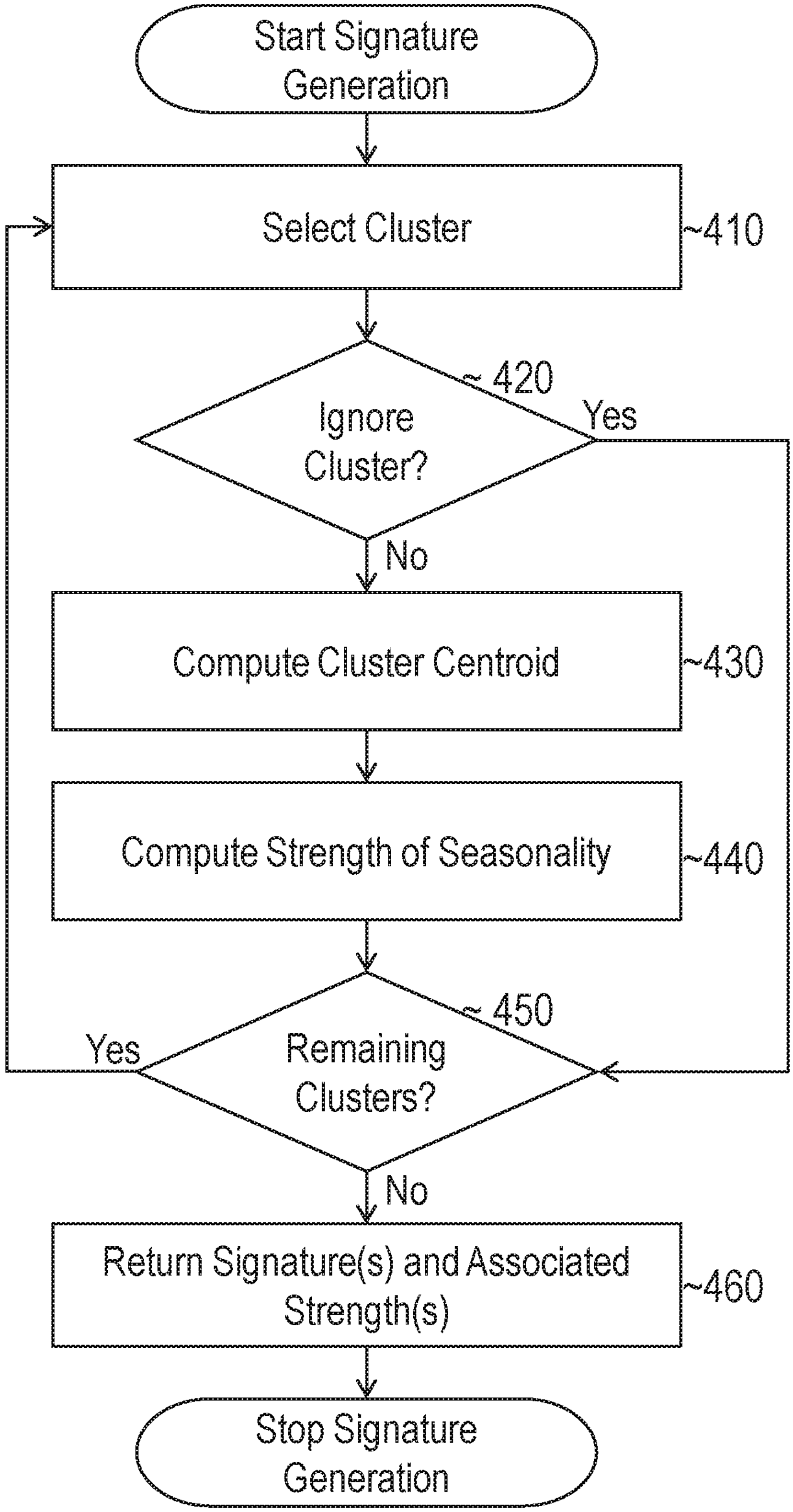
FIG. 4 illustrates an example set of operations for generating pattern signatures in accordance with one or more embodiments.

With reference to FIG. 4, an example set of operations for generating pattern signatures is illustrated. At 410, signature generation logic 120 selects a cluster from the set C of clusters. As will be described further below, a pattern may be generated for a cluster even if it is not included in the set P of patterns that are eventually output by seasonality analytic 100. Example scenarios where this may occur are when the strength of seasonality falls below a threshold and/or other patterns are determined to have stronger seasonality.

At 420 signature generation logic 120 determines whether to ignore the cluster or to generate a signature for the cluster. The circumstances under which a cluster is ignored may vary from implementation to implementation. In one or more embodiments, signature generation logic 120 ignores the cluster if it is does not satisfy a set of criteria indicating that the cluster is statistically significant. Example criteria may include, without limitation, conditions based on the variance of instances that belong to the cluster and conditions based on the number of data points within the cluster.

In one or more embodiments, signature generation logic 120 ignores clusters that group statistical constants. A statistical constant in this context is an instance where the variance of the sample values that belong to the instance is less than a threshold from the sample median. For example, signature generation logic 120 may estimate a sample variance for each instance that belongs to the cluster. Signature generation logic 120 may then find the shortest interval which contains a threshold percentage (e.g., 90%) of all the values for each instance and estimate the sample median for this interval. In the context of a cluster of Mondays, the sample median may be computed from the time interval 9 a.m. to 5 p.m. if it determined that this is the shortest interval that contains the threshold percentage of the values. If the instance has a variance that is less than a threshold percentage (e.g., 5%) of the sample median, then it may be considered as a statistical constant and excluded from consideration.

In one or more embodiments, signature generation logic 120 ignores clusters if the number of data points in the cluster is less than a threshold percentage (e.g., 5%) of the sample size. For example, if there are two clusters for Monday, and one of the clusters has less than the threshold percentage of the data points, then it may be ignored while the other cluster may be processed to generate a pattern that approximates data points for a prototypical Monday that aligns with that cluster.

At 430 signature generation logic 120 computes a centroid for the selected cluster to generate a signature for the cluster. A cluster centroid may be computed as the eigenvector corresponding to the maximum eigenvalue of a matrix computed from the cluster data matrix:

$$CD=M^TM \tag{10}$$

where CD represents the cluster data matrix, M represents a matrix of data points with columns representing different instances of a target sub-period of the season and rows representing different sample intervals/times within the target sub-period, and $M^T$ represents the transpose of M. The centroid is thus a vector of data points where each data point corresponds to a different sample time and where the vector approximates the distribution of data over the target sub-period for instances that align with that cluster.

At 440, signature generation logic 120 computes the strength of seasonality for the signature. The strength of seasonality is a value that is indicative of how strong the seasonal behavior of instances that belong to the cluster is. In one or more embodiments, the strength of seasonality is computed as follows:

$$PS = 1 - \frac{\left(\sum_{i=1}^{n} X_i\right)^2}{n} \tag{11}$$

where $(\Sigma_{i=1}{}^{n}=X_i)^2$ represents the sum of squares for each data point in the cluster and n represents the number of data points in the cluster.

At 450, signature generation logic 120 determines whether there are any remaining cluster in set C of clusters. If there are then signature generation logic 120 selects the next cluster in the set and repeats the process to potentially generate additional signatures and associated strength values. Once signature generation logic 120 has analyzed each cluster in the set C of clusters, then the process continues to 460.

At 460, the process returns the signatures and their associated strengths. These signatures may be further refined, annotated, and/or otherwise processed before the final set P of patterns is returned. For example, signatures that have a strength of seasonality below a threshold value may be filtered out. As another example, pattern processing logic 130 may refine and/or annotate signatures based on non-conforming data points as described in further detail below.

5. Non-Conformance Analysis

In one or more embodiments, pattern processing logic 130 is configured to detect if certain points or ranges of points are causing the strength of seasonality of a pattern to be reduced. These point are referred to as "non-conforming" data points or ranges of points as they do not exhibit the seasonal behavior of other data points within a generated pattern. If any non-conforming data points or ranges of points are detected, pattern processing logic 130 may take one or more responsive actions. Examples actions may include, without limitation, annotating or otherwise highlighting the non-conforming data points or ranges to bring them to the attention of a user, refining a generated pattern to remove the non-conforming data points or ranges, recomputing a strength of seasonality for a signature with the non-conforming data points or ranges removed, and generating a recommendation that accounts for non-conforming data points or ranges.

Non-conformance analysis may be helpful in scenarios where a user provides an input indicating that they would like a pattern to be generated for a particular timeframe. For example, a user may suspect seasonal behavior occurs from Monday through Friday within set D of time-series data. In response, seasonality analytic 100 may generate a pattern from the input timeframe but detect that Friday (an example range of data points) is bringing down the strength of seasonality for the pattern. As part of the analysis, seasonality analytic 100 may generate a second pattern for Monday through Thursday and determine that the second pattern has a stronger seasonality than the first pattern. Seasonality analytic may then recommend using the second pattern instead of the first pattern. In addition or alternatively, the analytic output may identify the windows of time within the season for which the seasonality is the strongest and the windows of time within the input timeframe that are weakening the strength of seasonality. In the present example, seasonality analytic 100 may recommend using Monday through Thursday as the seasonal timeframe for detected seasonal behavior rather than Monday through Friday.

In yet another embodiment, the seasonality analytic may output or display a first probability or value indicating the likelihood, confidence, or strength that the time series data is accurately represented by a model over the input timeframe, and/or a second probability or value indicating the likelihood, confidence, or strength that a resulting timeframe of the time series data is accurately represented by a model over the resulting timeframe, after one or more subperiods or ranges of data points (such as Fridays) have been excluded from the input timeframe.

Figure 5:
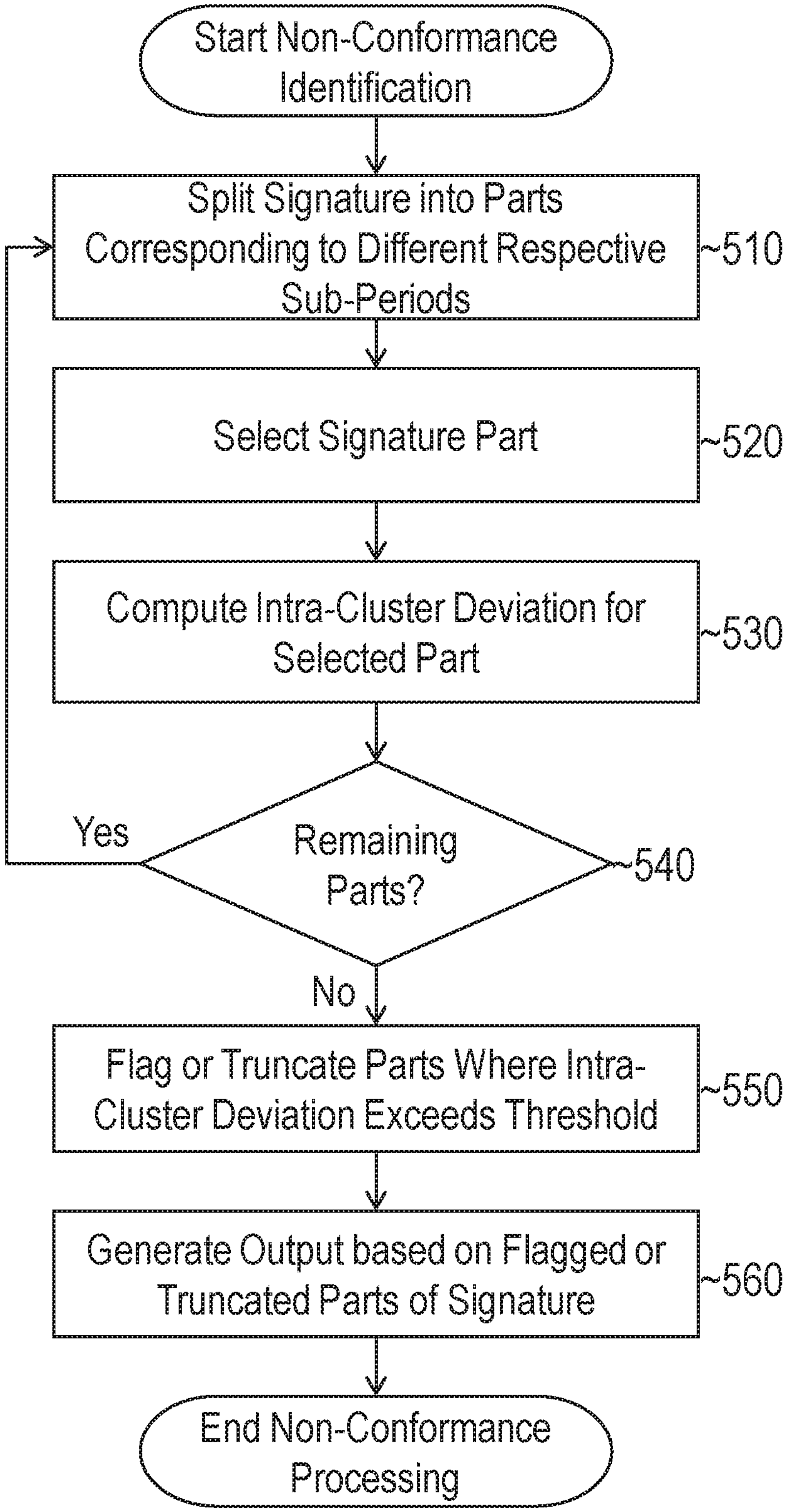
FIG. 5 illustrates an example set of operations for identifying non-conforming data points within a generated pattern in accordance with one or more embodiments.

With reference to FIG. 5, an example set of operations for identifying non-conforming data points within a generated pattern is illustrated. At 510, pattern processing logic 130 splits the signature into a set SP of parts $\{sp_1, \ldots, sp_n\}$ where each part corresponds to a different respective sub-period. The duration of the respective sub-periods may vary depending on the particular implementation. For instance, if a signature includes a sequence of values from Monday through Friday, then it may be split into five different parts, where each part represents a different day of the week. In addition or alternatively, the signature may be broken into eight hour segments and/or segments of some other duration. Each part may be considered a separate pattern for purposes of analysis.

At 520, pattern processing logic 120 selects a part from the set SP of parts to analyze whether the part should be classified as non-conforming.

At 530, pattern processing logic 120 computes the intra-cluster deviation for the selected part. For instance, if the selected part corresponds to Monday from a cluster that groups different Monday to Friday instances, then pattern processing logic 120 analyzes the data points in each instance that were collected during Mondays and determines the standard deviation for these data points.

At 540, pattern processing logic 120 determines whether there are any remaining parts to analyze. If so, then the process returns to 510 and selects the next part from the set SP. Otherwise, the process continues to 550.

At 550, pattern processing logic 120 flags or truncates parts of a signature where intra-cluster deviation exceeds a threshold value. The threshold may vary depending on the particular implementation. In one or more embodiments, pattern processing logic 120 may flag the part that has the largest deviation regardless of the magnitude of the deviation and bring the flagged part to the attention of the user. In addition or alternatively, pattern processing logic 120 may take into account the magnitude of the deviation to determine how to classify the part. A large deviation relative to other parts of the signature is indicative that the corresponding part includes non-conforming data points.

At 560, pattern processing logic 120 generates an output based on the flag or truncated parts of the signature. As previously indicated, pattern processing logic 120 may output an updated signature with the non-conforming parts removed and/or may identify the windows of time corresponding to non-conforming parts of the signature to alert a user.

Figure 6:
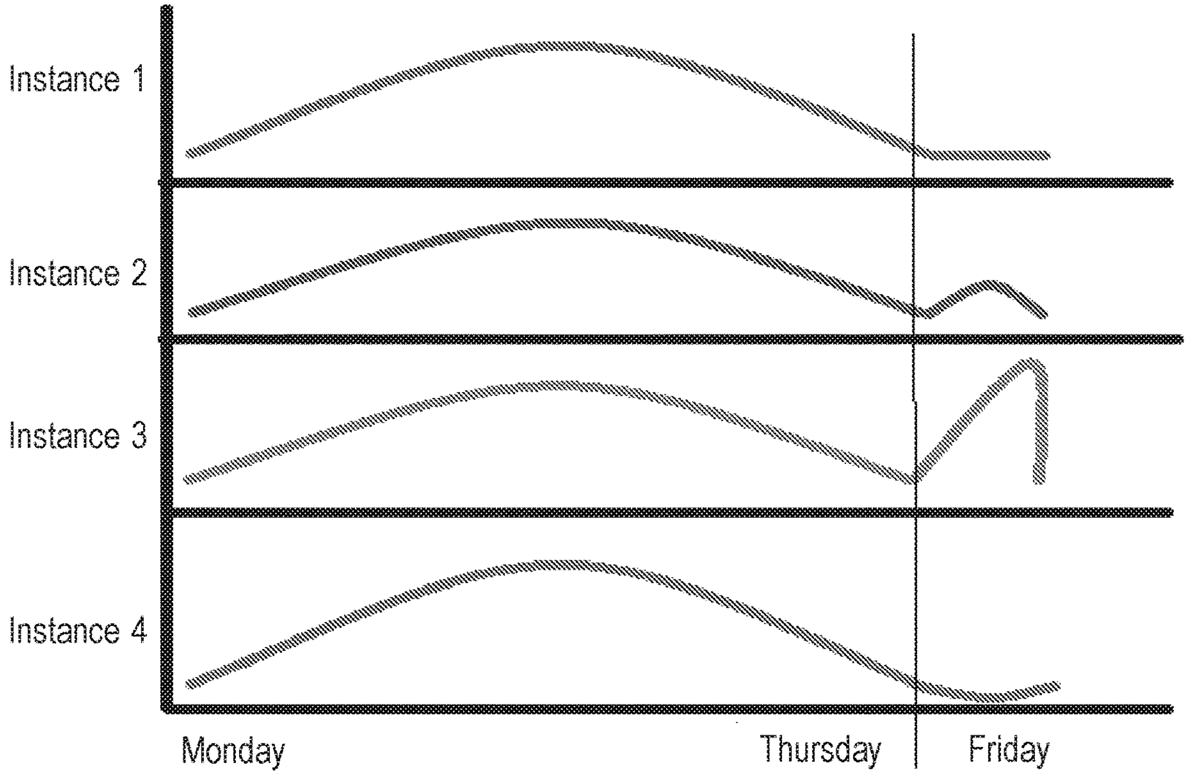
FIG. 6 illustrates an example set of instances of a season where some of the data points are non-conforming to a seasonal behavior in accordance with one or more embodiments.

With reference to FIG. 6, an example set of instances of a season where some of the data points are non-conforming to a seasonal behavior is illustrated. The chart plots values from four different instances of a season from Monday to Friday. As can be seen, a strong seasonality is observed for the four weeks; however, it is clear that there is a stronger seasonal behavior from Monday through Thursday than Monday through Friday. In such a scenario, the data points of the signature corresponding to Friday may be classified as non-conforming. These data points may be truncated from the signature to generate a new signature for Monday to Thursday. The non-conforming data points may also be returned as output from seasonality analytic 100. This output may be useful if an administrator or other user would like to identify which points to exclude from a linear regression analysis to forecast future values.

6. Multi-Pattern Analytics

The techniques described above may be used to detect multiple patterns in the same target sub-period(s) of a season. For instance, two or more seasonal behaviors may emerge over different Mondays, weekends, and/or some other sub-period during a week. In such a scenario, a plurality of clusters may be generated to group the different instances separately. Thus, for a given seasonality bucket being analyzed, a first cluster may group instances that align with and correspond to a first seasonal behavior exhibited on Mondays, a second cluster may group instances that align with and correspond to a second seasonal behavior exhibited on Mondays, etc. Other similarity buckets may similarly have multiple clusters representing different seasonal behaviors for other target sub-periods.

Once instance have been separately grouped, a signature may be generated for each cluster. Continuing with the above example for instance, a first signature may be generated for the first cluster of Mondays, a second signature for the second cluster of Mondays, etc. Thus, a first signature may represent a prototypical distribution for one type of Monday, and a second signature may represent a prototypical distribution for a second type of Monday.

Figure 7:
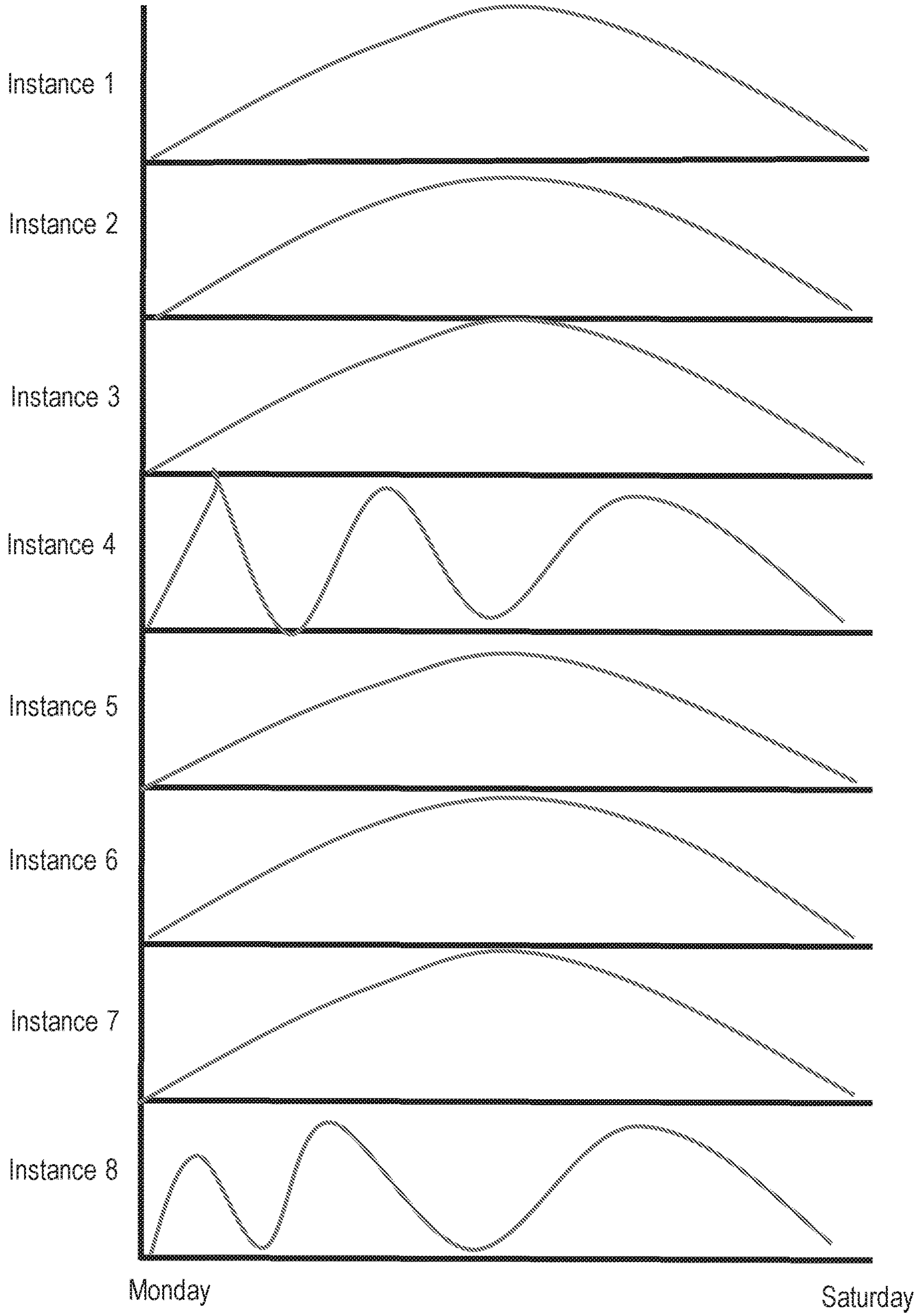
FIG. 7 illustrates an example set of instances of a season where different patterns may be generated for a same sub-period of a season in accordance with one or more embodiments.

With reference to FIG. 7, it illustrates an example set of instances of a season where different patterns may be generated for a same sub-period of a season. As can be seen, there are eight weeks of instances collected with two different types of seasonal behavior: one exhibited by instances 1, 2, 3, 5, 6, and 7, and another exhibited by instances 4 and 8. In such a scenario, clustering logic 110 may group the first set of instances into a first cluster and the second set of instances in a second cluster. A signature may be generated for each cluster to derive a set of data points approximating the different types of seasonal behaviors exhibited over the same sub-period (Monday to Saturday). The generated patterns may be used to perform a set of responsive actions such as described further below.

Figure 8A:
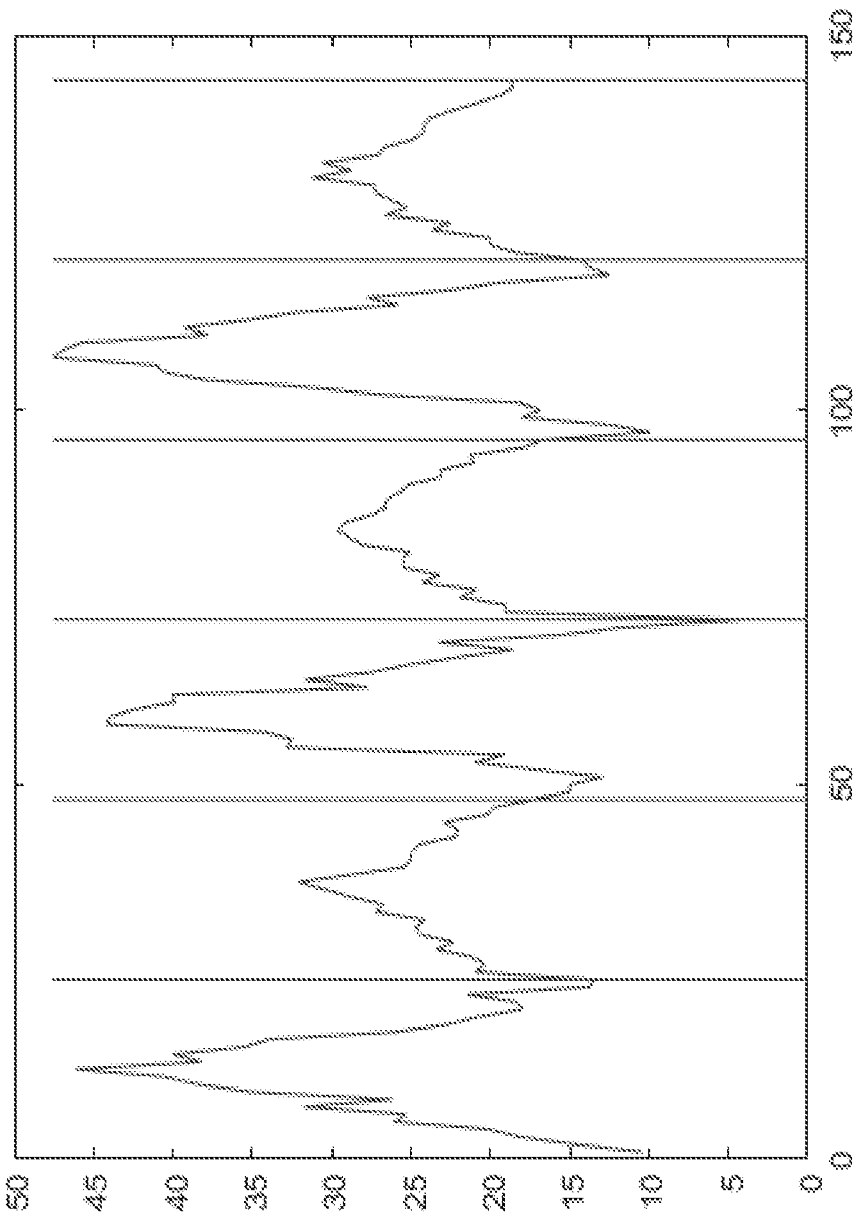
FIG. 8A illustrates an example set of instances where two separate seasonal behaviors are observed for multiple instances of the same sub-period in accordance with one or more embodiments.

With reference to FIG. 8A, an example set of instances is illustrated where two separate seasonal behaviors are observed for multiple instances of the same sub-period. The y-axis represent a magnitude of the sample data and the x-axis represents a sample number. Each line in the chart represents a partition between different Mondays. Thus, the chart represent six instances of six corresponding Mondays. As can be observed, there are two different types of Mondays—odd Mondays have a much higher peak than even Mondays.

Figure 8B:
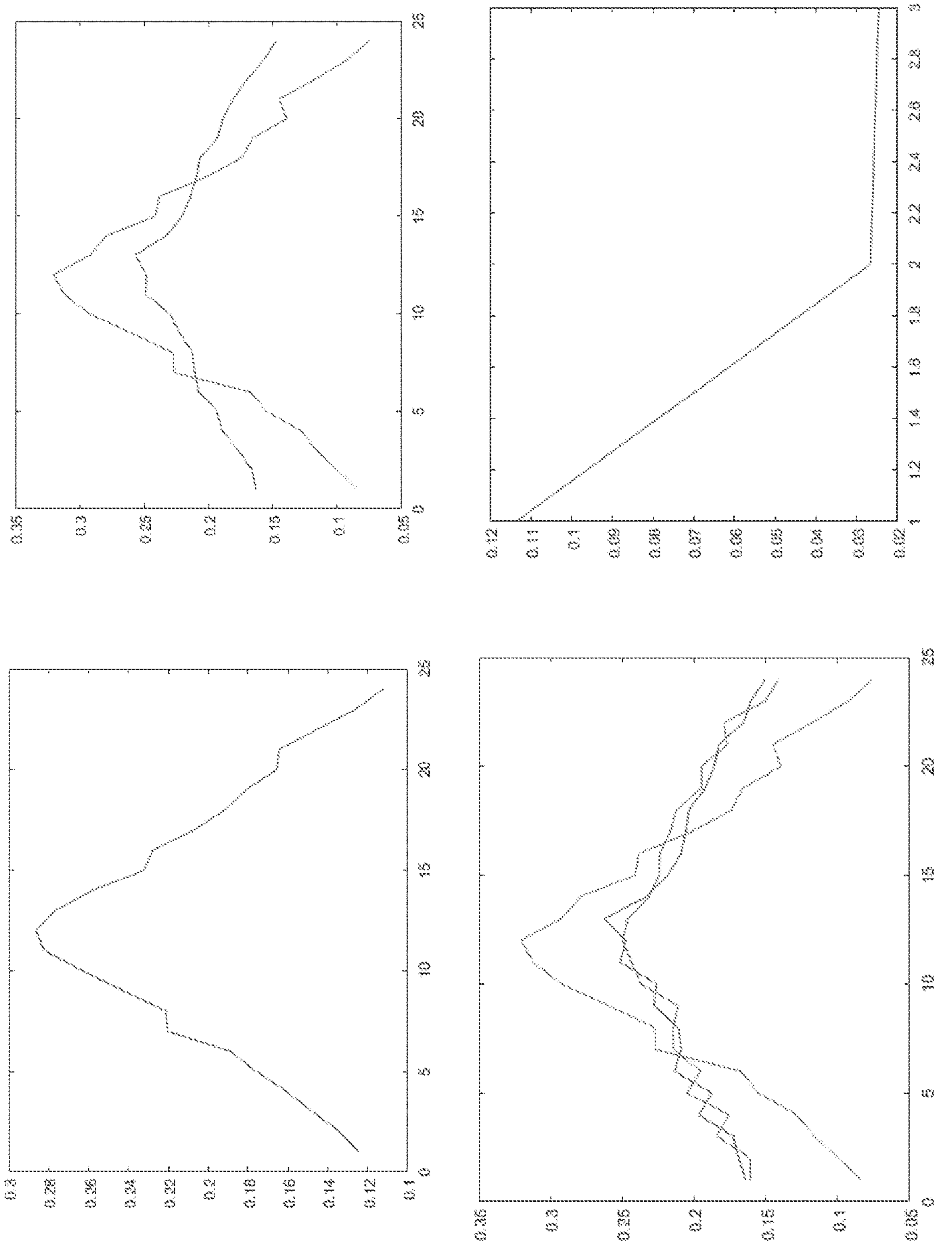
FIG. 8B illustrates an example set of chats where an objective function is computed to select how many clusters to use to group a set of instances in accordance with one or more embodiments.

With reference to FIG. 8B, an example set of charts is depicted where an objective function is computed to select how many clusters to use to group a set of instances. In this example, the chart is generating by running the clustering process previously described on the dataset depicted in FIG. 8A. Chart 810 depicts a centroid when all the instances are grouped into one cluster, chart 820 depicts two centroids for two separate clusters of Mondays; and chart 830 depicts three centroids for three separate clusters of Mondays. Chart 840 depicts the value of an optimization function versus the total number of clusters. An elbow may be observed (where the objective function changes slope more than thirty percent) at the number of clusters (k) is two. Since the optimum k value is two, the two signatures and their associated strengths may be returned.

The different patterns generated for a particular sub-period of a season may be used to analyze at least part of the same sub-period for subsequent instances of the season. For instance, pattern processing logic 130 may output a first pattern and a second pattern that represent different seasonal behaviors observed on Mondays. As time-series data is streaming in from a subsequent Monday, the portion of time-series data has been received may be compared against a corresponding part of the first pattern and second pattern. For example, if sample values from 8 a.m. until 12 a.m. have been received, then these sample values may be compared to a part of the first signature and a part of the second signature corresponding to the same sub-period—the rest of the signature may be truncated. The current Monday may be tentatively classified based on which pattern it is most closely aligned with. If the comparison indicates that the sample values from 8 a.m. to 12 a.m. are more similar to the corresponding part of the first signature than to the corresponding part of other signatures for Monday, then it may be associated with the first pattern. As previously indicated, the determination of similarity may be based on a cosine-based similarity function. In this instance however, the signature vector is truncated to match the samples it is being compared against.

In one or more embodiments, at least one responsive action is performed based at least in part on determining that at least part of a sub-period is more closely aligned with at least a corresponding part of one pattern rather than the corresponding part of other patterns for the same sub-period. In the scenario where a first type of Monday has much higher peaks than a second type of Monday, a set of capacity planning operations may be implemented based on whether a currently observed is more likely to align with the first type of Monday than the second type of Monday. In the event that it is tracking the pattern of the first type of Monday much more closely than the second type of Monday, additional resources may be brought online in anticipation of a higher demand. Conversely, if it is determined that the pattern is aligning more closely to the second type of Monday, then resources may be consolidated or brought offline in anticipation of lower highs.

In addition or as an alternative to capacity planning operations, other responsive action that are associated with a detected pattern may be taken. Examples may include, without limitation, sending notifications, recommendations, and/or other messages to an administrator to alert them when large highs are anticipated, performing maintenance operations when seasonal lows are anticipated, and adjusting system configurations. Thus, a variety of different responsive actions may be taken by one or more computing systems in response to detecting a particular pattern. As previously indicated, these actions may help improve the efficiency of resource utilization within these systems.

7. Patternless Datasets

In some cases, seasonality analytic 100 may not be able to validate seasonal behavior within a set of time-series data. This scenario may occur where the data is noisy and seasons have little to no impact on variations in the time-series. If seasonality analytic 100 is unable to validate any seasonal behavior, then the set P of patterns may be empty. Instead, seasonality analytic 100 may return a notification indicating that no seasonal patterns could be generated for the dataset.

Figure 9A:
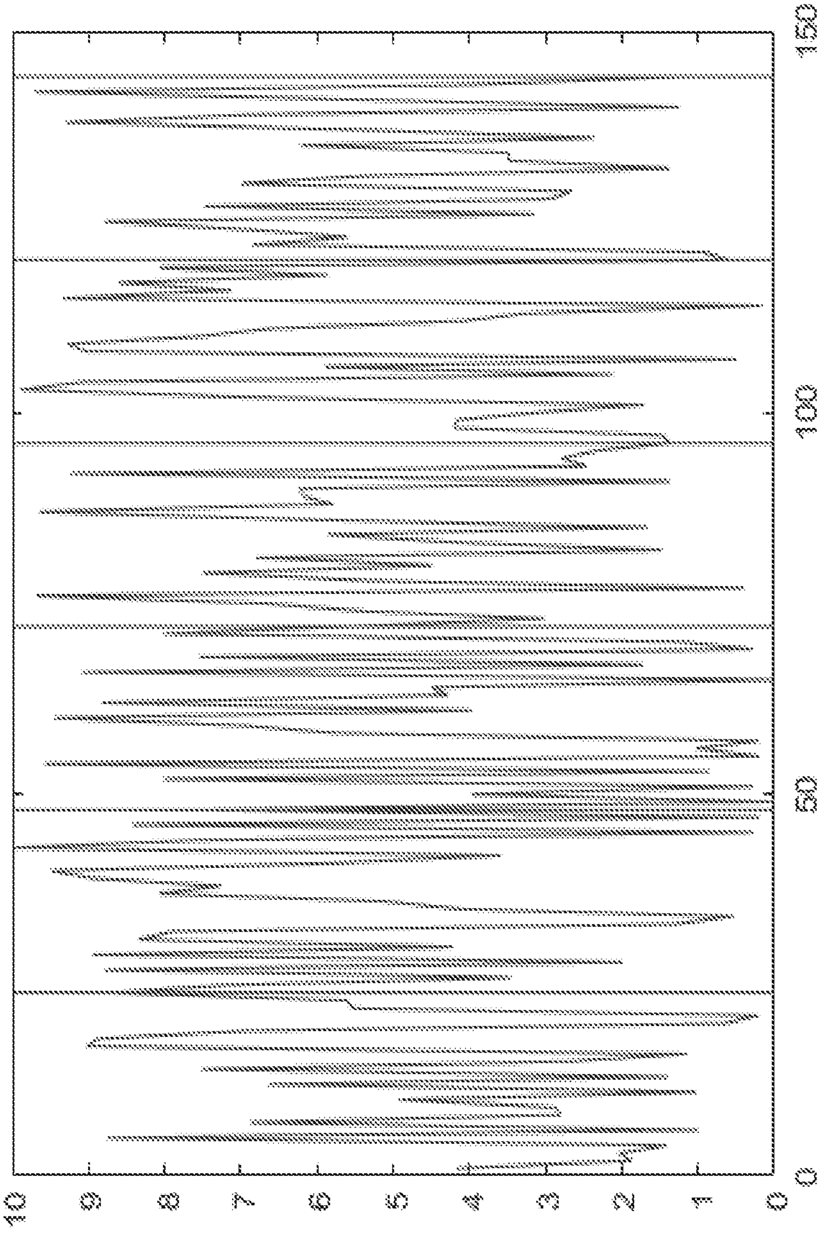
FIG. 9A illustrates an example set of instances where seasonal behavior is not detected in accordance with one or more embodiments.

FIG. 9A illustrates an example set of instances where seasonal behavior is not detected, in accordance with one or more embodiments. The dataset includes six different instances of Mondays. As can be seen, the data is very noisy and no discernible seasonality can be observed.

Figure 9B:
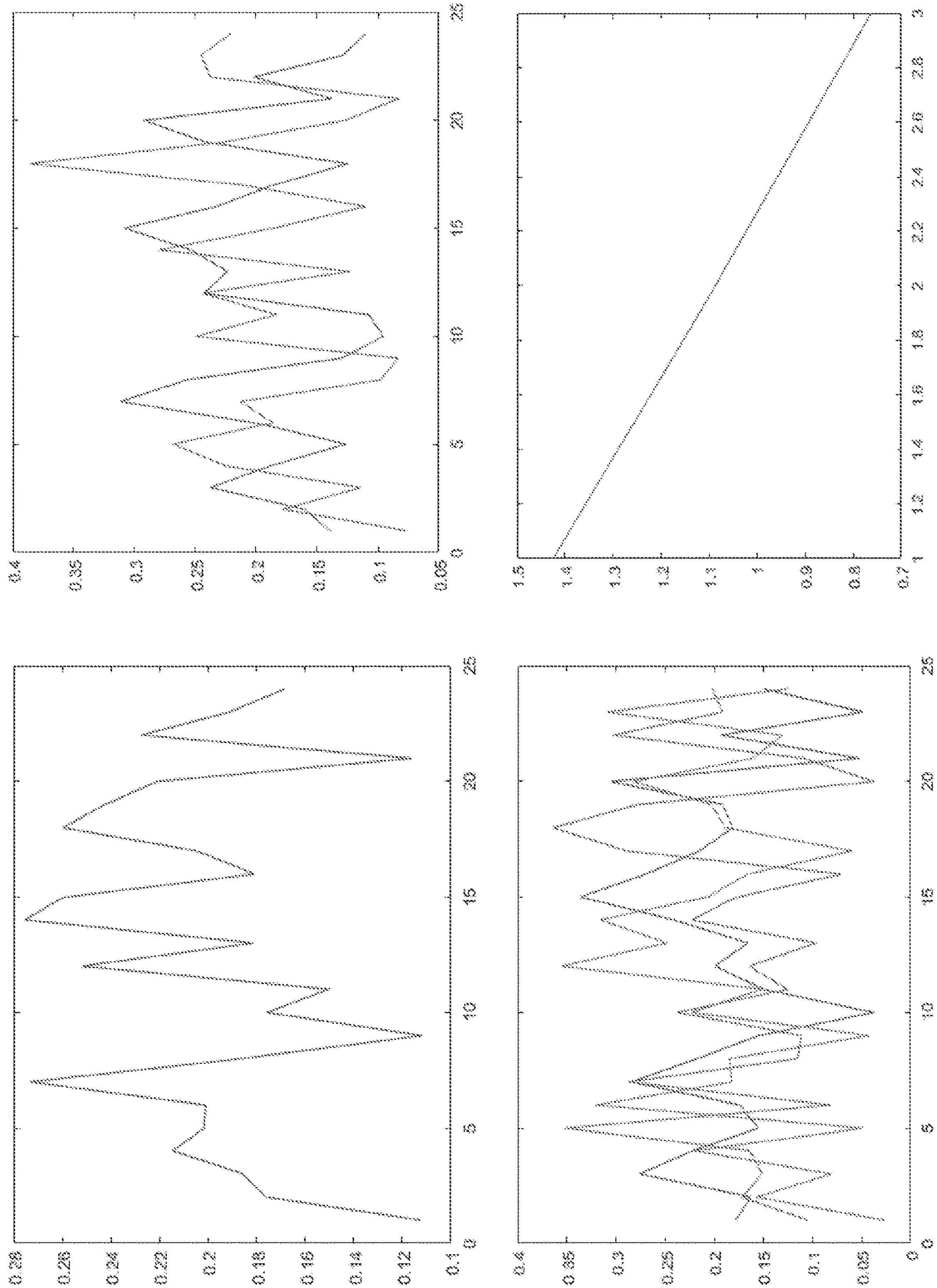
FIG. 9B illustrates an example set of chats where an objective function is computed to select how many clusters to use to group instances of a daily season and where no pattern is generated in accordance with one or more embodiments.

FIG. 9B illustrates an example set of charts where an objective function is computed to select how many clusters to use to group instances of a daily season and where no pattern is generated in accordance with one or more embodiments. In this example, the chart is generated by running the clustering process previously described on the dataset depicted in FIG. 9A. Chart 910 depicts a centroid when all the instances are grouped into one cluster, chart 920 depicts two centroids for two separate clusters of Mondays; and chat 930 depicts three centroids for three separate clusters of Mondays. Chart 940 depicts the value of an optimization function versus the total number of clusters. As can be seen, there is no significant change in the objective function. Thus, no seasonality is observed. In other words, none of the generated patterns could be validated for seasonality and are not returned in the result set.

8. Pattern Selection and Recommendations

The techniques described above may results in a plurality of patterns being generated and validated in some cases. For example, seasonality analytic 100 may analyze seasonal behavior of a time-series with respect to one or more seasonality buckets to generate a plurality of patterns for a single seasonality bucket and/or across multiple seasonality buckets. In addition or alternatively, seasonality analytic 100 may identify non-conforming data points within a given pattern signature to generate an updated signature. If a large number of patterns have been generated, then returning all of the generated patterns may overload a user with too much information.

If a plurality of signatures have been generated, then the strength of seasonality may be used to filter and sort through which patterns should be returned. For example, seasonality analytic may return the top n pattern signatures that have the strongest seasonality, where n may be any integer greater than or equal to one. In cases where n is equal to one, then the pattern that has the strongest seasonality may be automatically selected and used to perform further analytic operations, such as capacity planning operations or other responsive actions as previously described. If n is greater than one, then the patterns that are returned may be sorted by strength of seasonality. This allows patterns that have a stronger seasonality to be recommended or otherwise highlighted over patterns that have a weaker seasonality. Patterns whose strength of seasonality do not place them in the top n result set may be filtered out to reduce the amount of information that is returned.

In one or more embodiments, seasonality buckets may be factored into the analytic output that is presented to a user. For example, a user may select a particular seasonality bucket (e.g., Monday through Friday, weekly). Seasonality analytic 100 may search for patterns that are stronger but are within a threshold range of the requested window. For instance, seasonality analytic 100 may disregard seasonality buckets that are for different seasonal periods, such as monthly and quarterly seasons, regardless of the strength of seasonality that patterns in such seasonality buckets. In addition or alternatively, weightings may be applied based on how close alternative patterns are to the selected seasonality bucket. In the present example for instance, a pattern from Monday through Thursday might have a much stronger seasonality than Monday through Friday, but slightly lower strength than Monday through Wednesday. The pattern from Monday through Thursday may be selected or recommended over the patterns from Monday to Wednesday even though the former has a slightly weaker seasonality as it is closer to the specified timeframe and may have a stronger weighting.

In one or more embodiments, seasonality analytic 100 may present the top patterns for a plurality of different seasons. As an example, seasonality analytic may present a first set of one or more daily patterns with the highest strength of seasonality amongst all validated daily patterns, a second set of one or more weekly patterns with the highest strength of seasonality amongst all validated weekly patterns, a third set of one or more monthly patterns with the highest strength of seasonality amongst all validated monthly patterns, etc. Thus, a variety of recommendations and other analytic output generated by seasonality analytic 100 depending on the particular implementation.

In the above examples, the analytic output that is generated may differ depending on which pattern has the strongest strength of seasonality. For instance, if a first signature has a stronger seasonal strength than a second signature, then it may be sorted above, recommended, or selected over a second signature that has a weaker strength of signature. Conversely, the second signature may be sorted above, recommended, or selected over a first signature if the second signature has a stronger seasonal strength. Thus, the strength of seasonality may affect the output of seasonality analytic 100.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
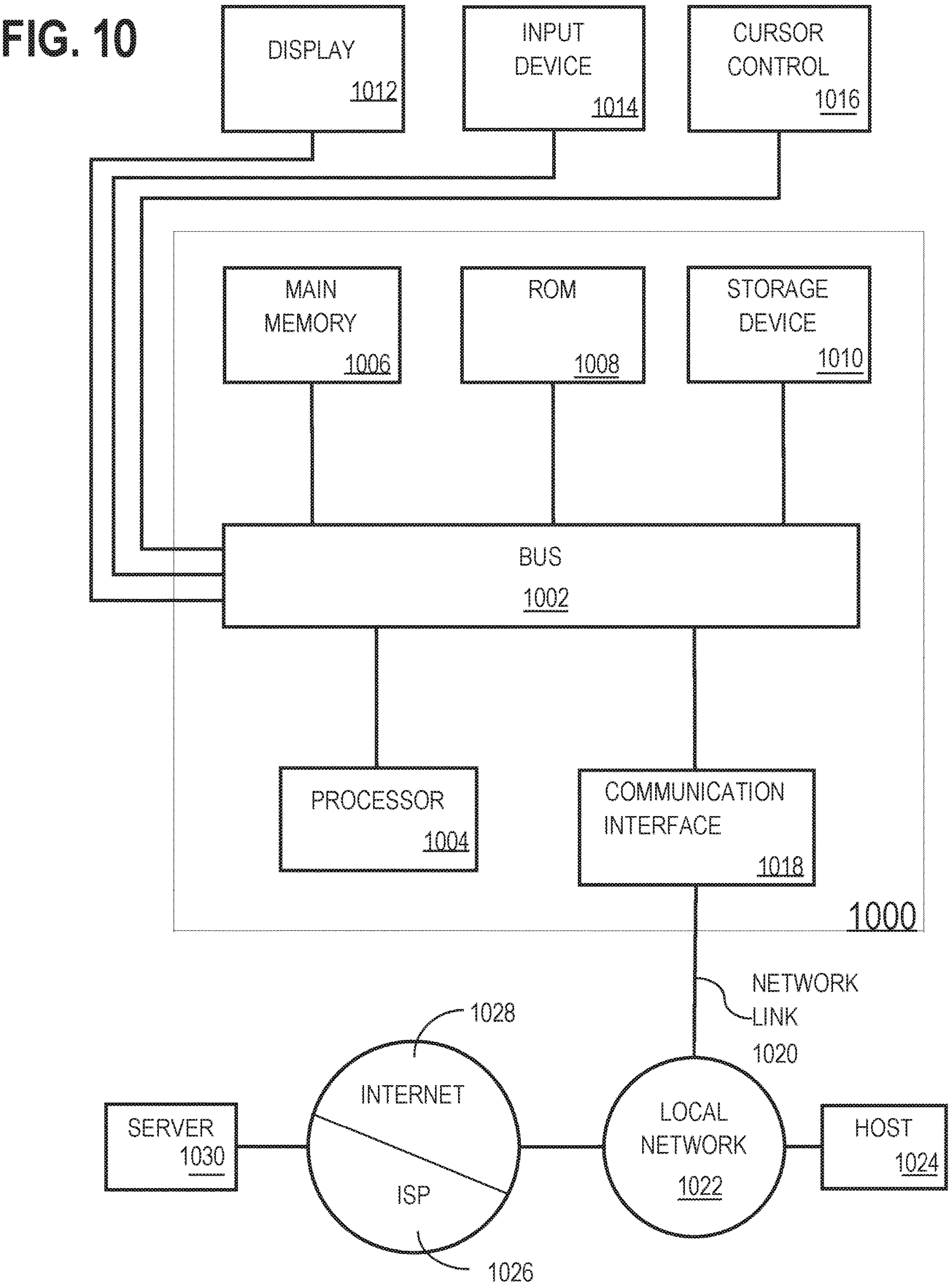
FIG. 10 illustrates an example computer system upon which one or more embodiments may be implemented.

For example, FIG. 10 is a block diagram that illustrates computer system 1000 upon which one or more embodiments may be implemented. Computer system 1000 includes bus 1002 or other communication mechanism for communicating information, and hardware processor 1004 coupled with bus 1002 for processing information. Hardware processor 1004 may be, for example, a general purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT), liquid crystal display (LCD), or light-emitting diode (LED), for displaying information to a computer user. Input device 1014, which may include physical and/or touchscreen based alphanumeric keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to host computer 1024 or to data equipment operated by Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving, by a system comprising one or more computing devices, a set of time-series data tracking metric values for a set of one or more computing resources;

generating, by the system, a first signature vector and a second signature vector representing different behaviors that recur, within the set of time-series data, seasonally among varying instances of a season having a particular duration such that:

each of the first signature vector and the second signature vector approximate data points of a same sub-period having a same duration of multiple instances of the season having the particular duration;

in the set of time-series data, a first set of instances of the season having the particular duration contain corresponding data points that align more closely to the first signature vector than to at least the second signature vector;

in the set of time-series data, a second set of instances of the season having the particular duration contain corresponding data points that align more closely to the second signature vector than to at least the first signature vector;

the first signature vector corresponding to a first type of seasonal behavior recurring in the first set of instances of the season having the particular duration and the second signature vector corresponding to a second type of behavior recurring in the second set of instances of the season having the particular duration; and the first signature vector is different from the second signature vector;

the first type of seasonal behavior includes higher seasonal highs for the season than the second type of seasonal behavior;

comparing, by the system, a set of data points, from a part of the same sub-period of one or more other instances of the season having the particular duration, with a first corresponding part of the first signature vector obtained by truncating the first signature vector and a second corresponding part of the second signature vector obtained by truncating the second signature vector to determine whether the set of data points align more closely with the first corresponding part of the first signature vector or the second corresponding part of the second signature vector that recur seasonally; and responsive to determining that the set of data points more closely align to the second corresponding part of the second signature vector than the first corresponding part of the first signature vector, consolidating, by the system, computing resources by bringing one or more computing resources offline to anticipate demand of lower seasonal highs on the set of one or more computing resources.

2. The method of claim 1, wherein a sequence of data points align more closely to the second signature vector than to at least the first signature vector if a similarity measure indicates that the sequence of data points is more similar to the second signature vector than the first signature vector.

3. The method of claim 2, wherein the similarity measure is determined based, at least in part, on a cosine similarity function that compares a vector including the sequence of data points with a vector including data points approximated by the first signature vector.

4. The method of claim 1 wherein generating, by the system, the first signature vector and the second signature vector comprises:

generating, by the one or more computing devices within volatile or non-volatile storage, a first cluster that groups the first set of instances and a second cluster that groups the second set of instances;

computing a first centroid of the first cluster and a second centroid of the second cluster;

wherein the first signature vector is generated based, at least in part, on the first centroid of the first cluster;

wherein the second signature vector is generated based, at least in part, on the second centroid of the second cluster.

5. The method of claim 1, further comprising identifying the sub-period for which to generate the first signature vector based, at least in part, on a determination of which data points within the first set of instances weaken a strength of seasonality between the first set of instances.

6. The method of claim 1, further comprising computing a strength of seasonality for the first signature vector based, at least in part, on a similarity measure that indicates how similar the same sub-period is within the first set of instances of the season.

7. The method of claim 1, wherein the season corresponds to a week of time and the same sub-period corresponds to one or more days within the week.

8. A method comprising:

generating, by a system, a first signature vector that approximates data points that seasonally recur within at least a first portion of a season in a set of time-series data;

splitting, by the system, the first signature vector into a plurality of parts, wherein each part corresponds to a different respective sub-period within the season;

clustering, by the system, a plurality of instances of the season into one or more clusters;

computing, by the system for each part in the plurality of parts, an intra-cluster deviation for at least one cluster of the one or more clusters;

identifying a subset of one or more parts of the plurality of parts where the intra-cluster deviation exceeds a threshold;

responsive to identifying the subset of one or more parts where the intra-cluster deviation exceeds the threshold, generating, by the system, a second signature vector by removing the subset of one or more parts from the first signature vector such that the second signature vector approximates data points that seasonally recur within a second portion of the season that is different than at least the first portion of the season;

in response to generating the second signature vector, selecting the second signature vector for operations to analyze a behavior of one or more computing resources;

analyzing the behavior of the one or more computing resources for deviations from the second signature vector; and responsive to analyzing the behavior of the one or more computing resources for deviations from the second signature vector, adjusting, by the system, a configuration of at least one of the one or more computing resources.

9. The method of claim 8, further comprising generating and presenting, to a user, an analytic output; wherein the analytic output ranks a plurality of signature vectors including the first signature vector and the second signature vector based on strength of seasonality.

10. The method of claim 9, wherein the season is a first season of a plurality of seasons, the method further comprising:

generating, by one or more computing devices, a third signature vector that approximates data points that seasonally recur within at least a portion of a second season;

wherein the second season has a different duration than the first season;

wherein the third signature vector is generated based on at least some of the data points used to generate the first signature vector.

11. The method of claim 8, further comprising:

determining, based on the intra-cluster deviation, that the subset of one or more parts weaken a strength of seasonality of the first signature vector.

12. The method of claim 8, further comprising:

receiving an input that indicates a first set of one or more windows of time within the season for which to generate a seasonal pattern;

generating and presenting, to a user based on the subset of one or more parts that have intra-cluster deviation exceeding the threshold, an analytic output indicating that seasonality is stronger for a second set of one or more windows of time than for the first set of one or more windows of time.

13. The method of claim 8, further comprising receiving, from a user, input selecting a plurality of seasonality buckets; responsive to the input, generating, for each selected seasonality bucket, a signature that represents a seasonal pattern with a stronger strength of seasonality than any other seasonal pattern for the selected seasonality bucket, and outputting the signature for each selected seasonality bucket.

14. One or more non-transitory computer-readable media storing instructions which, when executed by one or more computing devices, cause operations comprising:

receiving, by a system comprising one or more computing devices, a set of time-series data tracking metric values for a set of one or more computing resources;

generating, by the system, a first signature vector and a second signature vector representing different behaviors that recur, within the set of time-series data, seasonally among varying instances of a season having a particular duration such that:

each of the first signature vector and the second signature vector approximate data points of a same sub-period having a same duration of multiple instances of the season having the particular duration;

in the set of time-series data, a first set of instances of the season having the particular duration contain corresponding data points that align more closely to the first signature vector than to at least the second signature vector;

in the set of time-series data, a second set of instances of the season having the particular duration contain corresponding data points that align more closely to the second signature vector than to at least the first signature vector;

the first signature vector corresponding to a first type of seasonal behavior recurring in the first set of instances of the season having the particular duration and the second signature vector corresponding to a second type of behavior recurring in the second set of instances of the season having the particular duration; and the first signature vector is different from the second signature vector;

the first type of seasonal behavior includes higher seasonal highs for the season than the second type of seasonal behavior;

comparing, by the system, a set of data points, from a part of the same sub-period of one or more other instances of the season having the particular duration, with a first corresponding part of the first signature vector obtained by truncating the first signature vector and a second corresponding part of the second signature vector obtained by truncating the second signature vector to determine whether the set of data points align more closely with the first corresponding part of the first signature vector or the second corresponding part of the second signature vector that recur seasonally; and responsive to determining that the set of data points more closely align to the second corresponding part of the second signature vector than the first corresponding part of the first signature vector, consolidating, by the system, computing resources by bringing one or more computing resources offline to anticipate demand of lower seasonal highs on the set of one or more computing resources.

15. The one or more non-transitory computer-readable media of claim 14, wherein a sequence of data points align more closely to the second signature vector than to at least the first signature vector if a similarity measure indicates that the sequence of data points is more similar to the second signature vector than the first signature vector.

16. The one or more non-transitory computer-readable media of claim 15, wherein the similarity measure is determined based, at least in part, on a cosine similarity function that compares a vector including the sequence of data points with a vector including data points approximated by the first signature vector.

17. The one or more non-transitory computer-readable media of claim 14, wherein instructions for generating the first signature vector and the second signature vector comprise instructions, which when executed by one or more computing devices, cause operations comprising:

generating, by the one or more computing devices within volatile or non-volatile storage, a first cluster that groups the first set of instances and a second cluster that groups the second set of instances;

computing a first centroid of the first cluster and a second centroid of the second cluster;

wherein the first signature vector is generated based, at least in part, on the first centroid of the first cluster;

wherein the second signature vector is generated based, at least in part, on the second centroid of the second cluster.

18. The one or more non-transitory computer-readable media of claim 14, further storing instruction, which when executed by one or more computing devices, cause operations comprising identifying the sub-period for which to generate the first signature vector based, at least in part, on a determination of which data points within the first set of instances weaken a strength of seasonality between the first set of instances.

19. The one or more non-transitory computer-readable media of claim 14, further storing instruction, which when executed by one or more computing devices, cause operations comprising computing a strength of seasonality for the first signature vector based, at least in part, on a similarity measure that indicates how similar the same sub-period is within the first set of instances of the season.

20. The one or more non-transitory computer-readable media of claim 14, wherein the season corresponds to a week of time and the same sub-period corresponds to one or more days within the week.

21. One or more non-transitory computer-readable media storing instructions which, when executed by one or more computing devices, cause operations comprising:

generating, by a system, a first signature vector that approximates data points that seasonally recur within at least a first portion of a season in a set of time-series data;

splitting, by the system, the first signature vector into a plurality of parts, wherein each part corresponds to a different respective sub-period within the season;

clustering, by the system, a plurality of instances of the season into one or more clusters;

computing, by the system for each part in the plurality of parts, an intra-cluster deviation for at least one cluster of the one or more clusters;

identifying a subset of one or more parts of the plurality of parts where the intra-cluster deviation exceeds a threshold;

responsive to identifying the subset of one or more parts where the intra-cluster deviation exceeds the threshold, generating, by the system, a second signature vector by removing the subset of one or more parts from the first signature vector such that the second signature vector approximates data points that seasonally recur within a second portion of the season that is different than at least the first portion of the season;

in response to generating the second signature vector, selecting the second signature vector for operations to analyze a behavior of one or more computing resources;

analyzing the behavior of the one or more computing resources for deviations from the second signature vector; and responsive to analyzing the behavior of the one or more computing resources for deviations from the second signature vector, adjusting, by the system, a configuration of at least one of the one or more computing resources.

22. The one or more non-transitory computer-readable media of claim 21, further storing instructions, which when executed by one or more computing devices, cause operations comprising: receiving, from a user, input selecting a plurality of seasonality buckets; responsive to the input, generating, for each selected seasonality bucket, a signature that represents a seasonal pattern with a stronger strength of seasonality than any other seasonal pattern for the selected seasonality bucket, and outputting the signature for each selected seasonality bucket.

23. The one or more non-transitory computer-readable media of claim 22, wherein the seasonality buckets comprise a first seasonality bucket for weekends and a second seasonality bucket for weekdays.

24. The one or more non-transitory computer-readable media of claim 22, wherein the instructions further cause generating signatures for seasonality buckets within a threshold range of timeframe input by the user.

25. The one or more non-transitory computer-readable media of claim 21, further storing instructions, which when executed by one or more computing devices, cause operations comprising: generating and presenting, to a user, an analytic output; wherein the analytic output ranks a plurality of patterns signature vectors including the first signature vector and the second signature vector based on strength of seasonality.

26. The one or more non-transitory computer-readable media of claim 25, wherein the season is a first season of a plurality of seasons, wherein the instructions, when executed by one or more computing devices, further cause operations comprising:

generating, by one or more computing devices, a third signature vector that approximates data points that seasonally recur within at least a portion of a second season;

wherein the second season has a different duration than the first season;

wherein the third signature vector is generated based on at least some of the data points used to generate the first signature vector.

27. The one or more non-transitory computer-readable media of claim 21, further storing instructions, which when executed by one or more computing devices, cause operations comprising:

determining, based on the intra-cluster deviation, that the subset of one or more parts weaken a strength of seasonality of the first signature vector.

28. The one or more non-transitory computer-readable media of claim 21, further storing instructions, which when executed by one or more computing devices, cause operations comprising:

receiving an input that indicates a first set of one or more windows of time within the season for which to generate a seasonal pattern;

generating and presenting, to a user based on the subset of one or more parts that have intra-cluster deviation exceeding the threshold, an analytic output indicating that seasonality is stronger for a second set of one or more windows of time than for the first set of one or more windows of time.

* * * * *

UNITED STATES PATENT AND TRADEMARK OFFICE

CERTIFICATE OF CORRECTION

PATENT NO. : 11,263,566 B2
APPLICATION NO. : 15/186938
DATED : March 1, 2022
INVENTOR(S) : Maheshwari et al.

It is certified that error appears in the above-identified patent and that said Letters Patent is hereby corrected as shown below:

In the Drawings

On sheet 1 of 12, in FIG. 1, under Reference Numeral 130, Line 3, Delete "Logic130" and insert -- Logic 130 --, therefor.

In the Specification

In Column 3, Line 33, delete "$L_t=\alpha(X_t-S_{t-p})+(1-\alpha)(L_{t-1}+T_{t-1})$ (1)" and insert -- $L_t=\alpha(X_t/S_{t-p})+(1-\alpha)(L_{t-1}+T_{t-1})$ (5) --, therefor.

In Column 3, Line 35, delete "(2)" and insert -- (6) --, therefor.

In Column 3, Line 37, delete "$S_t=\delta(X_t-L_t)+(1-\delta)S_{t-p}$ (3)" and insert -- $S_t=\delta(X_t/L_t)+(1-\delta)S_{t-p}$ (7) --, therefor.

In Column 4, Line 55, delete "performed" and insert -- performed. --, therefor.

In Column 7, Line 23, delete "PATTERNS"U.S." and insert -- PATTERNS"; U.S. --, therefor.

In Column 12, Line 11, delete "$(\Sigma_{i=1}{}^{n}=X_i)^2$" and insert -- $(\Sigma^n{}_{i=1}\ X_i)^2$ --, therefor.

In Column 14, Line 9, delete "Analtyics" and insert -- Analytics --, therefor.

Signed and Sealed this
Second Day of August, 2022

Katherine Kelly Vidal

Katherine Kelly Vidal
*Director of the United States Patent and Trademark Office*